US010203722B2

(12) United States Patent
Gonzalez, III

(10) Patent No.: US 10,203,722 B2
(45) Date of Patent: Feb. 12, 2019

(54) AUXILIARY SCREEN

(71) Applicant: Jose Luis Gonzalez, III, Clayton, NC (US)

(72) Inventor: Jose Luis Gonzalez, III, Clayton, NC (US)

(*) Notice: Subject to any disclaimer, the term of this patent is extended or adjusted under 35 U.S.C. 154(b) by 0 days.

(21) Appl. No.: 15/668,400

(22) Filed: Aug. 3, 2017

(65) Prior Publication Data
US 2018/0039300 A1    Feb. 8, 2018

Related U.S. Application Data

(60) Provisional application No. 62/370,273, filed on Aug. 3, 2016.

(51) Int. Cl.
| G06F 1/16 | (2006.01) |
| G05B 1/01 | (2006.01) |
| H04M 1/725 | (2006.01) |
| H04L 29/08 | (2006.01) |
| G06F 3/041 | (2006.01) |
| G06F 3/0488 | (2013.01) |
| H04M 1/04 | (2006.01) |

(52) U.S. Cl.
CPC ............ G06F 1/1626 (2013.01); G05B 1/01 (2013.01); G06F 1/1601 (2013.01); G06F 1/1616 (2013.01); G06F 1/1632 (2013.01); G06F 1/1643 (2013.01); G06F 1/1647 (2013.01); G06F 1/1654 (2013.01); G06F 3/0416 (2013.01); G06F 3/0488 (2013.01); H04L 67/04 (2013.01); H04M 1/72527 (2013.01); H04M 1/04 (2013.01)

(58) Field of Classification Search
None
See application file for complete search history.

(56) References Cited

U.S. PATENT DOCUMENTS

| 6,489,932 | B1 * | 12/2002 | Chitturi .............. G06F 1/1601 345/173 |
| 6,538,880 | B1 * | 3/2003 | Kamijo ............... G06F 1/1616 248/65 |
| 7,054,965 | B2 * | 5/2006 | Bell .................... G06F 1/1626 345/1.1 |
| 8,630,088 | B2 * | 1/2014 | Collopy ............... G06F 1/1616 361/679.55 |
| 2006/0160570 | A1 | 7/2006 | Kamarainen |
| 2012/0164956 | A1 | 6/2012 | Infanti et al. |
| 2013/0053097 | A1 | 2/2013 | Phillips |
| 2013/0207778 | A1 | 8/2013 | Neafsey et al. |

* cited by examiner

*Primary Examiner* — K. Wong
(74) *Attorney, Agent, or Firm* — Daniel Boudwin, Esq.; Global Intellectual Property Agency, LLC

(57) ABSTRACT

An auxiliary screen. The auxiliary screen includes a display having a screen, wherein a compartment is disposed within the display. An opening of the compartment is disposed along a lateral side of the display. A housing is slidably disposed within the compartment, wherein the housing can selectively move between an open position and a closed position. The housing can further receive a mobile device therein. The mobile device is operably connected to the display, such that the screen displays the graphical interface of the mobile device. An input device that can allow a user to interact with the graphical interface of the mobile device is operably connected to the display.

18 Claims, 3 Drawing Sheets

AUXILIARY SCREEN

CROSS REFERENCE TO RELATED APPLICATIONS

This application claims the benefit of U.S. Provisional Application No. 62/370,273 filed on Aug. 3, 2016. The above identified patent application is herein incorporated by reference in its entirety to provide continuity of disclosure.

BACKGROUND OF THE INVENTION

The present invention relates to auxiliary screens. Specifically, the present invention relates to auxiliary screens with a receiving compartment for a mobile device.

Many people use personal electronic devices, such as smartphones, calculators, and assorted media devices, which offer mobile computing, albeit with limited or, in the case of servers, mini-PCs, and video players, non-existent screen size. Using a device with a small screen can pose difficulty for a great number of users, such as those with impaired vision. Additionally, other users may desire greater screen space, which allows a user to simultaneously perform multiple tasks. Furthermore, many of the personal electronic devices described above lack a variety of input methods, such as a keyboard, touchscreen, or cursor control, such as a mouse. While a user can transfer a display of a mobile device to another screen, this requires multiple independent devices, often secured together by merely a wire, which can increase the risk of misplacing or dropping the mobile device, leading to increased expense in replacing or repairing the mobile device. Therefore, it is necessary to provide an auxiliary screen that is configured to be operably connected to a mobile device, and is further configured to operate as an alternate input device, wherein the mobile device is removably secured within the auxiliary screen.

SUMMARY OF THE INVENTION

In view of the foregoing disadvantages inherent in the known types of auxiliary screens now present in the known art, the present invention provides an auxiliary screen wherein the same can be utilized for providing convenience for the user when extending or duplicating the graphical interface of a mobile device.

The present system comprises a display having a screen, wherein a compartment is disposed within the display. The compartment further comprises an opening disposed along a lateral side of the display. A housing is slidably disposed within the compartment, wherein the housing is configured to selectively move between an open position and a closed position. A mobile device is removably securable within the housing. The mobile device is operably connected to the display, such that the screen is configured to display the graphical interface of the mobile device. An input device is operably connected to the display, such that the input device is configured to allow a user to interact with the graphical interface.

In some embodiments, an outer surface of the housing rests flush with the lateral side when the housing is in the closed position. In another embodiment, the input device comprises a keyboard. In other embodiments, the input device comprises a touch-sensitive screen. In yet another embodiment, a cover is pivotally affixed to a lower side of the display, wherein the cover is configured to move between a stand position and a covered position, wherein the cover is configured to rest flush against the screen when in the covered position. In some embodiments, the cover comprises a first portion pivotally affixed to a second portion. In another embodiment, the first portion engages an upper side of the display and the second portion is configured to rest flush against a surface when the cover is in the stand position.

In other embodiments, a plurality of ports are disposed on the lateral side, wherein the plurality of ports are configured to operably connect the mobile device to the display. In yet another embodiment, a wireless receiver is disposed within the display, wherein the wireless receiver is configured to operably connect the mobile device to the display. In some embodiments, one or more speakers are disposed within the display, the one or more speakers configured to output audio signals generated by the mobile device. In another embodiment, the housing further comprises a pair of protrusions slidably disposed on an outer side of the housing, each of the protrusions configured to engage a corner of the mobile device. In other embodiments, the pair of protrusions comprise an L-shape. In yet another embodiment, the housing further comprises a pair of arms slidably disposed along opposing sides of the housing, each arm having an upper section and a lower section, wherein the upper section extends towards the center of the housing and is configured to engage a corner of the mobile device. In some embodiments, the upper section is pivotally affixed to the lower section. In another embodiment, a gripping member is disposed at a distal end of the upper section of each arm, the gripping member configured to engage the corner of the mobile device. In other embodiments, the gripping member is pivotally affixed to the distal end of the upper section of each arm. In yet another embodiment, the gripping member comprises an L-shape. In some embodiments, the gripping member is composed of a material having a coefficient of friction greater than one so as to effectively grip and secure the mobile device.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
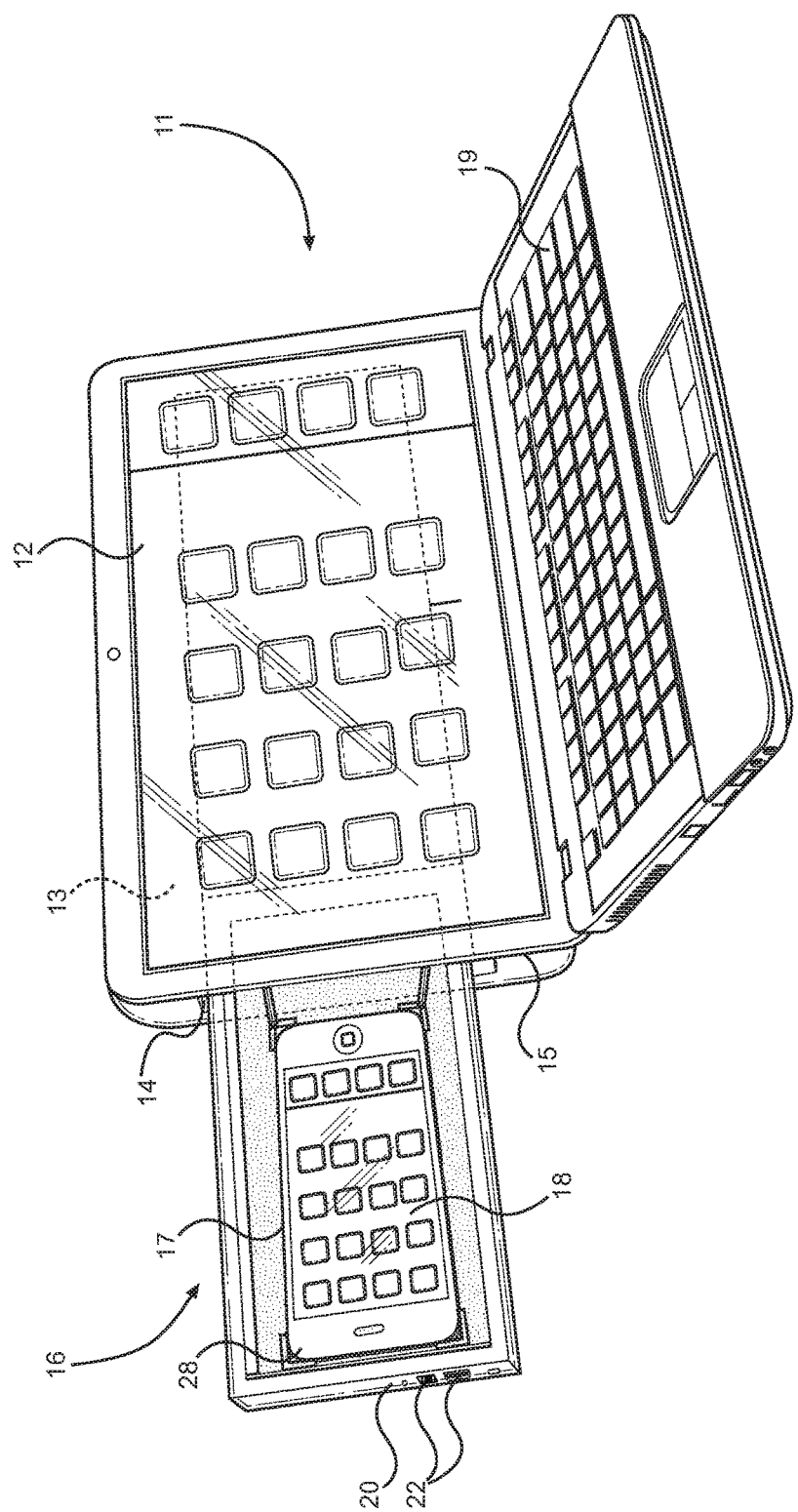
FIG. 1 shows a perspective view of an embodiment of the auxiliary screen in use, the housing in the open position.

Reference is made herein to the attached drawings. Like reference numerals are used throughout the drawings to depict like or similar elements of the auxiliary screen. The figures are intended for representative purposes only and should not be considered to be limiting in any respect.

Figure 2:
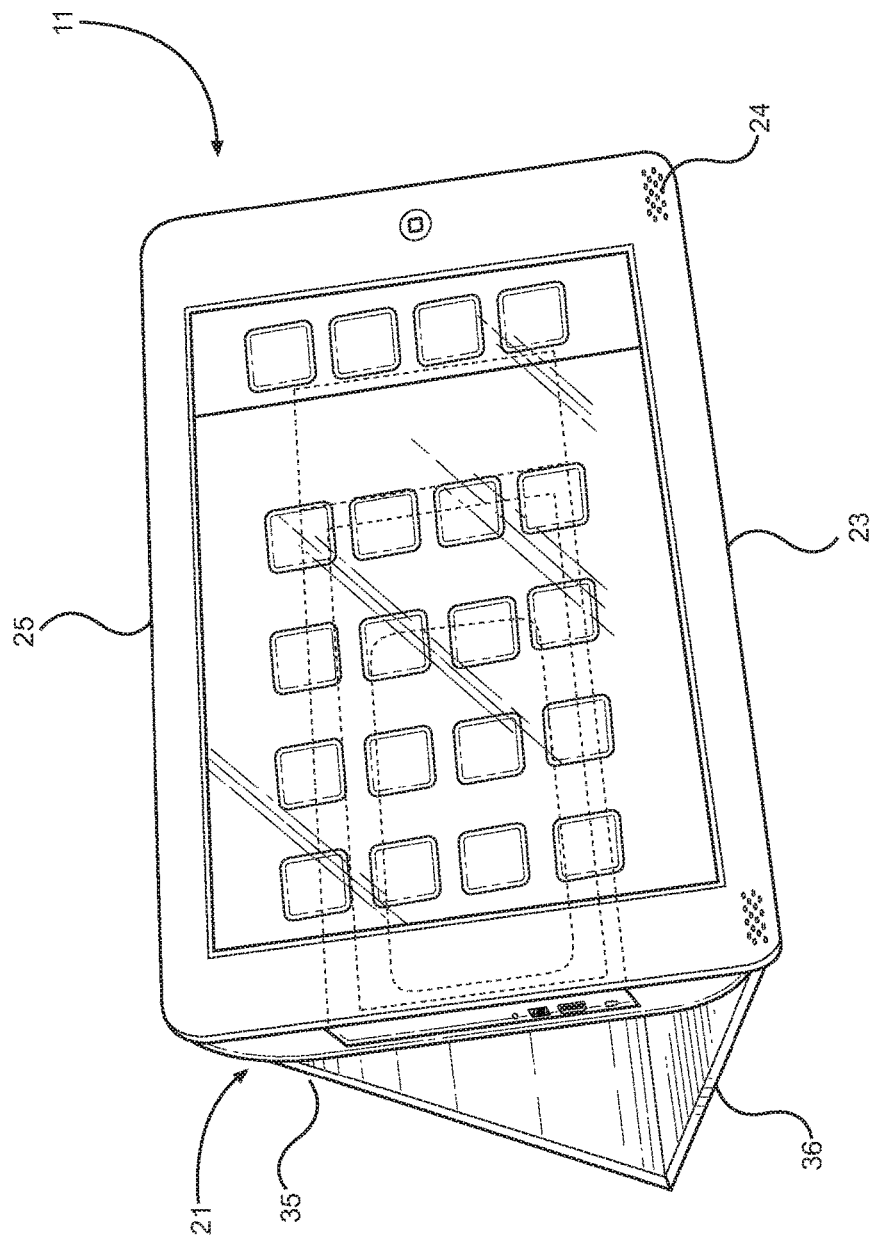
FIG. 2 shows a perspective view of an alternate embodiment of the auxiliary screen with a cover, the housing in the closed position.

Referring now to FIG. 1, there is shown a perspective view of an embodiment of the auxiliary screen in use, the housing in the open position. The auxiliary screen comprises a display 11 having a screen 12 disposed thereon. The screen 12 is configured to display a visual input received by the display 11, such as a graphical interface 18 of a mobile device 17. A compartment 13 is disposed within the display 11. An opening 14 of the compartment 13 is disposed on a lateral side 15 of the display 11, such that the interior of the compartment 13 can be accessed therethrough. The compartment 13 is configured to slidably receive a housing 16 therein. In some embodiments, the display 11 further comprises one or more speakers (as shown in FIG. 2, 24) configured to emit audio signals generated by a mobile device 17. In the illustrated embodiment, the display 11 comprises the form factor of a laptop computer, however in alternate embodiments, the display 11 comprises a form factor of a tablet or 2-in-1 computer.

The housing 16 is configured to selectively move between an open position and a closed position, wherein an outer surface 20 of the housing 16 rests flush against the lateral side 15 when the housing 16 is in the closed position, as shown in FIG. 2. In this way, the display 11 comprises a minimalistic form factor when the housing 16 is in the closed position, preventing the housing 16 from catching on external obstacles while allowing for easier transport. In some embodiments, the compartment 13 further comprises a latch configured to secure the housing 16 in the closed position. The housing 16 is configured to removably secure the mobile device 17 therein. In the illustrated embodiment, the mobile device 17 is frictionally secured within the housing 16 at each corner 28 of the mobile device 17. The display 11 is configured to be operably connected to the mobile device 17, such that a graphical interface 18 of the mobile device 17 is displayed on the screen 12 when the mobile device 17 is operably connected to the display 11. The display 11 is configured to be able to operate when the housing 16 is in both the open position and the closed position, allowing a user to interact with the graphical interface 18 using both the mobile device 17 and the display 11 simultaneously, or to interact with the graphical interface 18 using solely the display 11.

In the illustrated embodiment, the display 11 further comprises a plurality of ports 22 disposed on the lateral side 15. The plurality of ports 22 are configured to operably connect a mobile device 17 to the display 11. In this way, the graphical interface 18 can be extended or replicated on the screen 12, allowing a user a greater viewing area than that of the mobile device 17. In one exemplary use, a user can operably connect the mobile device 17 to the display 11, allowing the screen 12 to be used as either a replacement screen 12 for the mobile device 17 or to increase the viewing area of the mobile device 17, such that the user is able to simultaneously interact with the graphical interface 18 via both the mobile device 17 and the display 11. In the illustrated embodiment, the plurality of ports 22 comprise a USB and an HDMI connection, however other types of ports known in the art can be included. In an alternate embodiment, the mobile device 17 is operably connected to the display 11 via a wireless signal transmitted from the mobile device 17 to a wireless receiver disposed within the display 11.

The display 11 further comprises an input device 19 operably connected to the display 11, such that the input device 19 allows a user to interact with the graphical interface 18. In the illustrated embodiment, the input device 19 comprises a keyboard pivotally affixed to the display 11. However, in alternate embodiments, the input device 19 includes, but is not limited to, a touch-sensitive screen, a keypad, and a cursor control, such as a mouse. In embodiments having a touch-sensitive screen, the display 11 is further configured to display a virtual keyboard and to be utilized as a touch-sensitive cursor control, allowing a user to interact with the graphical interface 18. Additional input devices 19 can be operably connected to the display 11 via the plurality of ports 22 or via a wireless connection. In some embodiments, the display 11 is configured to act as the sole viewing screen for mobile devices 17 that lack an inherent display, such as a server or mini-PC.

Referring now to FIG. 2, there is shown a perspective view of an alternate embodiment of the auxiliary screen with a cover, the housing in the closed position. In the illustrated embodiment, the display 11 comprises a tablet form factor, wherein a cover 21 is pivotally affixed to a lower side 23 of the display 11. In the illustrated embodiment, the cover 21 comprises a first portion 35 and a second portion 36, wherein the first portion 35 of the cover 21 is pivotally affixed to the second portion 36 of the cover 21, and wherein the second portion 36 of the cover 21 is pivotally affixed to the lower side 23 of the display 11. The cover 21 is configured to selectively move between a covered position and a stand position, wherein the cover 21 is configured to rest flush against the screen when in the covered position. In this way, a user can protect the screen from damage that may be caused by impacts or scratches. When the cover 21 is in the stand position, the second portion 36 of the cover 21 is configured to rest flush against a surface, such as a table or other support surface, and the first portion 35 engages an upper side 25 of the display 11, creating a triangular shape defined by the first portion 35 of the cover 21, the second portion 36 of the cover 21, and the display 11. In this way, a user can rest the display 11 in an upright position on the cover 21.

Figure 3:
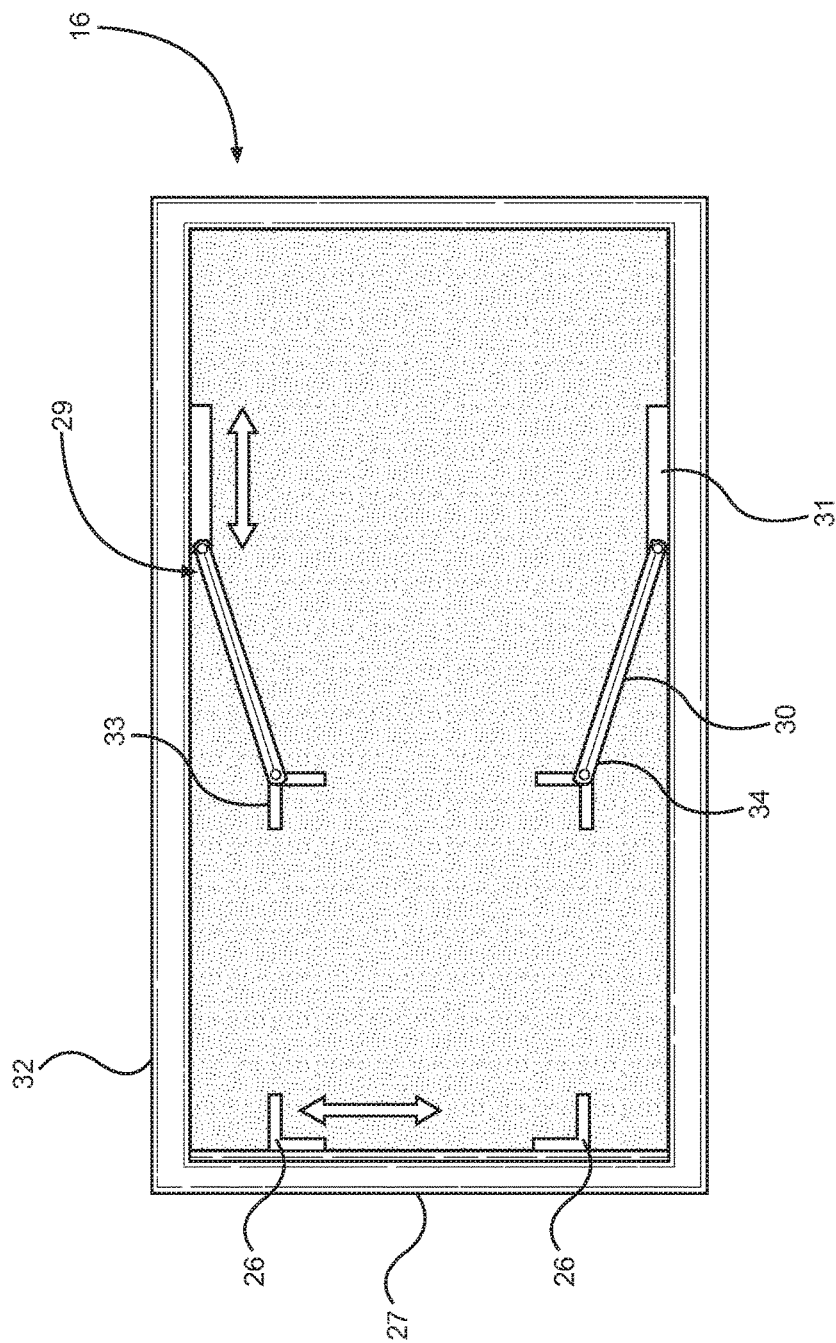
FIG. 3 shows a top plan view of the housing of an embodiment of the auxiliary screen.

Referring now to FIG. 3, there is shown a top plan view of the housing of an embodiment of the auxiliary screen. In the illustrated embodiment, the housing 16 comprises a pair of opposing sides 32 and an outer side 27, wherein the pair of opposing sides 32 slidably engage with the compartment of the display. A pair of protrusions 26 are slidably disposed along the outer side 27 of the housing 16. The pair of protrusions 26 can each be adjusted along the length of the outer side 27 in order to engage the corners of a variety of mobile devices having different dimensions. In the illustrated embodiment, the pair of protrusions 26 comprise an L-shape configured to rest flush against the corners of a mobile device. In some embodiments, the pair of protrusions 26 further comprise a material having a coefficient of friction greater than one such that the mobile device is frictionally secured within the housing 16.

A pair of arms 29 are slidably disposed along the pair of opposing sides 32. In this way, the position of the pair of arms 29 can be adjusted along the pair of opposing sides 32. The pair of arms 29 comprise an upper section 30 and a lower section 31, wherein the lower section 31 is slidably engaged with the pair of opposing sides 32. The upper section 30 extends towards the center of the housing 16 and is configured to engage a mobile device. In the illustrated embodiment, the upper section 30 is pivotally affixed to the lower section 31 such that the position of the upper section 30 can be adjusted to accommodate a variety of mobile devices.

The illustrated embodiment further comprises a gripping member 33 disposed at a distal end 34 of the upper section 30. The gripping member 33 is configured to engage the corner of the mobile device. In the illustrated embodiment, the gripping member 33 is pivotally affixed to the distal end 34 such that the angle of the gripping member 33 is adjustable to accommodate a variety of mobile devices having different dimensions. In some embodiments, the gripping member 33 comprises a material having a coefficient of friction greater than one, allowing the mobile device to be frictionally engaged therewith. In the illustrated embodiment, the gripping member 33 comprises an L-shape such that it rests flush against the corner of the mobile device, allowing a greater surface area of contact to secure the mobile device thereagainst.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An auxiliary screen, comprising:
   a display having a screen;
   a compartment disposed within the display, the compartment having an opening disposed along a lateral side of the display;
   a housing slidably disposed within the compartment, wherein the housing is configured to move between an open position and a closed position;
   wherein a pair of protrusions are slidably affixed to an interior surface of an outer sidewall of the housing, such that the pair of protrusions are configured to slide along a longitudinal axis of the outer sidewall;
   wherein the pair of protrusions are configured to removably secure a mobile device therebetween;
   wherein the display is configured to be operably connected to the mobile device, such that the screen is configured to display a graphical interface of the mobile device;
   an input device operably connected to the display, such that the input device is configured to allow a user to interact with the graphical interface.

2. The auxiliary screen of claim 1, wherein an outer surface of the housing is configured to rest flush with the lateral side when the housing is in the closed position.

3. The auxiliary screen of claim 1, wherein the input device comprises a keyboard.

4. The auxiliary screen of claim 1, wherein the input device comprises a touch-sensitive screen.

5. The auxiliary screen of claim 1, further comprising a cover pivotally affixed to a lower side of the display, wherein the cover is configured to move between a stand position and a covered position, wherein the cover is configured to rest flush against the screen when in the covered position.

6. The auxiliary screen of claim 5, wherein the cover comprises a first portion and a second portion, the first portion pivotally affixed to the second portion.

7. The auxiliary screen of claim 6, wherein the first portion engages an upper side of the display, and wherein the second portion is configured to rest flush against a surface when the cover is in the stand position.

8. The auxiliary screen of claim 1, further comprising a plurality of ports disposed on the lateral side, the plurality of ports configured to operably connect the mobile device to the display.

9. The auxiliary screen of claim 1, further comprising a wireless receiver disposed within the display, the wireless receiver configured to operably connect the mobile device to the display.

10. The auxiliary screen of claim 1, further comprising one or more speakers disposed within the display, the one or more speakers configured to output an audio signal generated by the mobile device.

11. The auxiliary screen of claim 1, wherein each protrusion of the pair of protrusions comprises an L-shape.

12. The auxiliary screen of claim 1, wherein each protrusion of the pair of protrusions comprises a material having a coefficient of friction greater than one.

13. The auxiliary screen of claim 1, wherein the housing further comprises a pair of arms, each arm having an upper section and a lower section, the pair of arms slidably disposed along opposing sides of the housing, wherein the upper section of each arm extends towards the center of the housing, wherein the upper section is configured to engage a corner of the mobile device.

14. The auxiliary screen of claim 13, wherein the upper section of each arm is pivotally affixed to the lower section of each arm.

15. The auxiliary screen of claim 13, wherein a gripping member is disposed at a distal end of the upper section of each arm, the gripping member configured to engage the corner of the mobile device.

16. The auxiliary screen of claim 15, wherein the gripping member is pivotally affixed to the distal end of the upper section of its respective arm.

17. The auxiliary screen of claim 15, wherein each gripping member comprises an L-shape.

18. The auxiliary screen of claim 15, wherein each gripping member comprises a material having a coefficient of friction greater than one.

* * * * *